Figure 1:
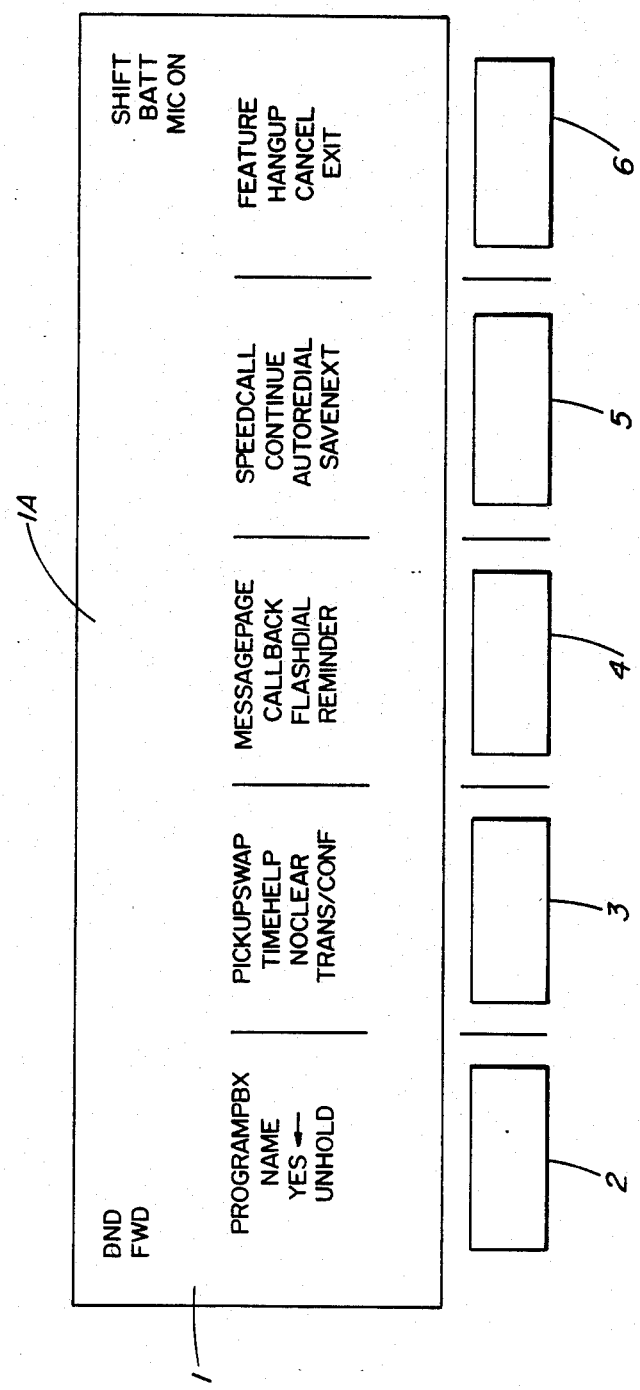

United States Patent [19]

Brennan et al.

[11] Patent Number: 4,805,211
[45] Date of Patent: Feb. 14, 1989

[54] SUBSCRIBER SET PROGRAMMING MODULE

[75] Inventors: Robert P. Brennan, Pakenham; Joseph Camelon, Richmond; J. Bernard Trudel, Ottawa, all of Canada

[73] Assignee: Trillium Telephone Systems Inc., Ontario, Canada

[21] Appl. No.: 928,053

[22] Filed: Nov. 7, 1986

[30] Foreign Application Priority Data

May 6, 1986 [CA] Canada ................................. 508496

[51] Int. Cl.⁴ ............................................. H04M 1/27
[52] U.S. Cl. ...................................... 379/355; 379/354
[58] Field of Search ...................... 379/91, 93, 96, 144, 379/142, 355, 357, 354, 97, 98

[56] References Cited

U.S. PATENT DOCUMENTS

| | | | |
|---|---|---|---|
| 4,039,761 | 8/1977 | Nicoud et al. | 379/355 X |
| 4,473,720 | 9/1984 | Hegi | 379/355 X |
| 4,503,288 | 3/1985 | Kessler | 379/357 X |
| 4,625,276 | 11/1986 | Benton et al. | 379/357 X |
| 4,654,482 | 3/1987 | DeAngelis | 379/91 X |

FOREIGN PATENT DOCUMENTS

| | | |
|---|---|---|
| 0092084 | 3/1983 | European Pat. Off. . |
| 0075120 | 3/1983 | European Pat. Off. . |
| 56-17556 | 2/1981 | Japan ............. 179/18 BA |
| 56-140793 | 11/1981 | Japan ................. 379/244 |
| 0044361 | 3/1982 | Japan ................. 379/355 |
| 0164363 | 9/1983 | Japan ................. 379/244 |
| 0077559 | 5/1985 | Japan ................. 379/355 |
| 0106259 | 6/1985 | Japan ................. 379/357 |
| 2043399 | 10/1980 | United Kingdom . |

OTHER PUBLICATIONS

Friedman, "Communications in the Computer Age", Radio-Electronics, Nov. 1985, pp. 98, 100.

Primary Examiner—James L. Dwyer
Attorney, Agent, or Firm—Antonelli, Terry & Wands

[57] ABSTRACT

A programming module for programming a plurality of unprogrammed subscriber sets with data signals stored in a single programmed subscriber set. The module receives data signals from the programmed set, and stores them in an electrically erasable read only memory. The module is then disconnected from the set and reconnected to successive ones of the unprogrammed sets, for loading the data signals therein, such that the one or more unprogrammed sets become programmed in accordance with the data signals received from the programmed set. The data signals are typically comprised of special feature access codes and speed call numbers.

20 Claims, 3 Drawing Sheets

SUBSCRIBER SET PROGRAMMING MODULE

This invention relates in general to telephone subscriber sets and in particular to a programming module for programming one or more unprogrammed subscriber sets with data signals received from a programmed subscriber set.

Modern day subscriber sets frequently include one or more memory circuits for storing data signals corresponding to frequently dialled telephone numbers, designated as speed call numbers. The set automatically dials a predetermined one of the speed call telephone numbers in response to a local subscriber depressing an associated speed call key on the set.

According to the prior art, in the event that each of a plurality of subscribers is to have access to the same speed call numbers, the subscribers are required to individually and manually program their respective sets to store the speed call numbers. This has been found to be quite time consuming, and there is significant likelihood of human error as a result of manually programming the sets.

According to another prior art system wherein the subscriber sets are connected to a central PABX, the speed call numbers are typically stored in a central memory of the PABX such that in the event a subscriber depresses a predetermined speed call key on his or her set, predetermined proprietary control signals are generated by the set for reception by the PABX, which in response accesses and dials the stored number.

In addition to storing speed call numbers, modern day subscriber sets may be programmable to generate proprietary PABX or centrex special feature access codes for initiating implementation of one or more special features such as call hold, transfer, page, etc. An example of such a programmable subscriber's set is the TALK TO ® 1000 subscriber set or the Trillium ® 1000 subscriber set, both manufactured by Trillium Telephone Systems Inc. described in Applicant's co-pending U.S. patent application Ser. No. 903,143, filed Sept. 3, 1986. These sets are capable of storing up to 90 speed call numbers as well as a multiplicity of special feature access codes.

Special feature codes are typically in the form of a tip and ring hookswitch flash followed by one or more dialled digit signals. Accordingly, in the event that it is desired to program a plurality of subscriber sets to generate the same special feature access codes for use with a central PABX or centrex facility, each subscriber is required to manually program his or her individual set with the proprietary special feature access codes, which is both tie consuming and susceptible of human error, as discussed above.

According to the present invention, a programming module is provided for receiving and storing data signals representative of speed call numbers and special feature access codes from a first programmed subscriber set and transferring the stored data signals to a plurality of additional sets, such that the additional sets become programmed with the data signals from the first programmed set. The programming module connects conveniently to the subscriber sets via a recess located in the rear surfaces thereof. The subscriber set and programming module co-operate to generate prompt message signals for assisting the local subscriber in effecting transfer of the data signals from the the subscriber set to the programming module, and vice versa.

The prior art problem of time consuming and error prone manual programming of individual sets is overcome by the programming module according to the present invention, since a plurality of unprogrammed sets can be programmed automatically and accurately in a fraction of the time required to program the sets manually. The module is of straightforward and inexpensive design, and is easy to use as a result of the module and set cooperating to generate the aforementioned prompt message signals.

Figure 2:
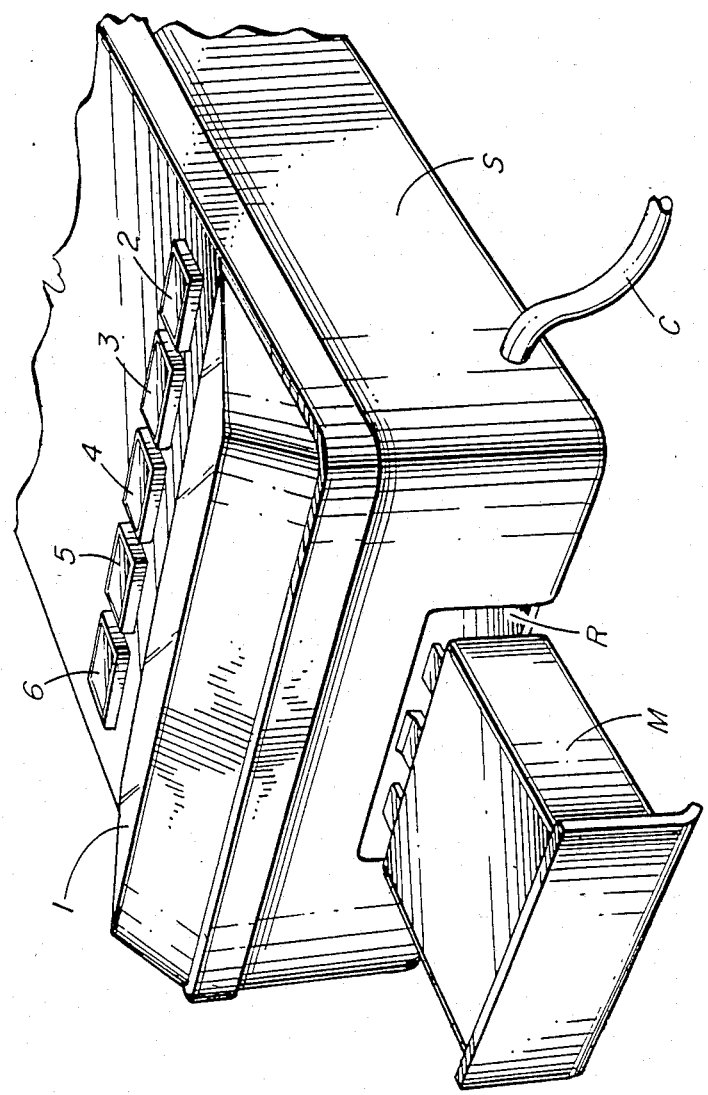
Figure 3:
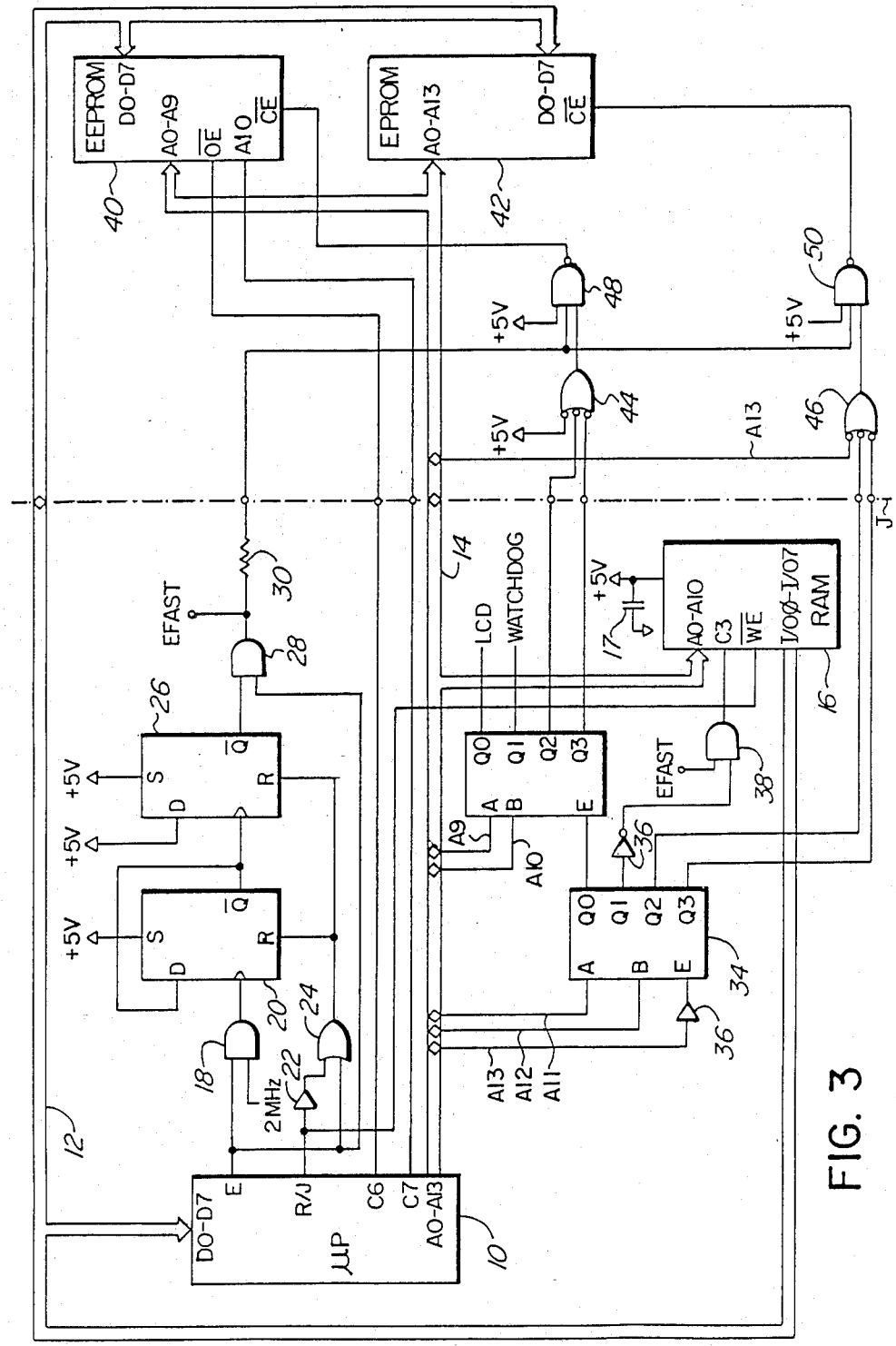

A better understanding of the present invention will be obtained with reference to description below in conjunction with the following drawings, in which FIG. 1 is a plan view of a portion of a subscriber set for use with the programming module according to the present invention, illustrating a plurality of soft keys and an LCD display, FIG. 2 is a partial rear perspective view of the programming module being connected to the subscriber set, and FIG. 3 is a schematic diagram of the programming module according to a preferred embodiment of the present invention, shown connected to microprocessor circuitry of the subscriber set of FIGS. 1 and 2.

With reference to FIGS. 1 and 2, an LCD display 1 is illustrated for displaying a plurality of prompt message signals useful in aiding implementation of one or more special features as well as programming the set, as described in greater detail below.

A first plurality of prompt message signals are displayed in five columns associated with five programmable or soft keys 2-6, respectively. Additional prompt message signals are generated in the region of LCD 1 denoted as 1A, (FIG. 1), disposed above the five columns, and comprised, for instance, of a fifteen character dot matrix LCD.

During the course of a telephone call, LCD 1 provides an indication of which of a plurality of special features may be implemented at a particular instant of time, depending on which special features have been programmed into the set.

The manner in which special feature access codes are programmed into the set, and the manner in which they are generated by the set for transmission to a PABX or centrex facility do not form part of the present invention, but are described in detail in the afore-mentioned co-pending U.S. patent application Ser. No. 903,143.

A preferred method of using the programming module M (FIG. 2) will now be described in relation to a successful implementation wherein the module was loaded with data signals from a programmed TALK TO ® 1000 subscriber set S (FIG. 2), and the data signals were subsequently transmitted from the module M for storage in a further unprogrammed TALK TO ® 1000 subscriber set, such that the unprogrammed set was programmed with the speed call numbers and special feature access codes stored in the programmed set.

Firstly, a power cord C (FIG. 2) from the programmed subscriber set S is disconnected from a wall socket, etc. Data signals within the set S are stored in a battery backed up CMOS random access memory circuit, discussed with reference to FIG. 3, so as not to be lost in response to disconnection of electrical power from the set.

Secondly, a feature module (not shown) which is of identical dimensions as module M, is disconnected and removed from a recess R in the rear portion of the set S, as shown in FIG. 2. The feature module according to the TALK TO ® 1000 set, comprises read only memory circuitry containing an operating system program for controlling normal operation of the set via microprocessor circuitry disposed within the set, as discussed below with reference to FIG. 3.

Next, the programming module M is inserted in the recess R so as to be connected to the subscriber set S in place of the removed feature module, and the power cord C is reconnected.

In response, the LCD 1 displays a "COPY MEMORY" prompt message signal at 1A, (FIG. 1), and a "CONTINUE" prompt message signal in the column above soft key 5.

In order to proceed with programming the module with the data signals stored in the set, the subscriber presses soft key 5 to implement the "CONTINUE" function. In response, LCD 1 displays "SET TO MODULE?" at 1A, a "YES" message signal above soft key 2 and a "NO" message above soft key 3. Since it is desired to transfer data signals from the programmed set to the module, the subscriber presses soft key 2 for acknowledging the "SET TO MODULE?" prompt signal in the affirmative.

In response to pressing soft key 2, a "PLEASE WAIT" message signal appears at 1A while the data signals stored in the microprocessor circuitry of the set are transferred to the programming module.

Transfer of the data signals from the programmed set to the programming module typically requires approximately 30 seconds for completion, after which a "COPY MEMORY" message signal appears at 1A to indicate that programming of the module has been completed.

Next, the subscriber disconnects the power cord C from the programmed set S, removes the programming module M, replaces the feature module, and then reconnects the power cord C, thereby restoring the set S to its normal operating mode.

The programming module has now been loaded with data signals corresponding to the speed call numbers and special feature access codes stored in the programmed set, and can now be used to program one or a plurality of unprogrammed sets with the stored data signals.

In order to program an unprogrammed TALK TO ® 1000 subscriber set with the data stored in the programming module, the power cord C from the unprogrammed set is disconnected, the feature module is removed from the back thereof and the programming module M is inserted in place thereof.

Next, the power cord C is reconnected and the "COPY MEMORY" message signal appears at 1A. The subscriber then presses soft key 5 to implement the "CONTINUE" function upon which the "SET TO MODULE?" message signal appears at 1A. In response, the subscriber presses soft key 3 corresponding to the "NO" prompt signal. LCD 1 then displays a "MODULE TO SET?" message signal to inquire of the subscriber whether the data transfer is proceeding from the module to the set. The subscriber then depresses soft key 2 corresponding to the "YES" prompt signal in order to acknowledge in the affirmative.

According to the preferred embodiment, the programming module of the present invention is capable of programming one of either special feature access codes only, speed dial numbers only, or both special feature access codes and speed dial numbers. Thus, while it may be desirable for a plurality of unprogrammed set to be loaded with the special feature access codes of a common PABX, it is possible that individual subscribers would prefer to store their own speed call numbers. Conversely, in the event that the sets are not connected to PABX or centrex facilities but are instead simply connected via one or more telephone lines to a telephone central office, it is not necessary to store special feature access codes although it may be desirable to store frequently used common speed dial numbers.

Hence, in response to depressing soft key 2 for initiating data signal transference from the module to the set, LCD 1 displays the message "PABX DATA ONLY?" at 1A.

In order to program PABX or centrex special feature access codes only, the subscriber depresses the "YES" key 2. In response, the module transfers the data signals to the set and LCD 1 displays the "COPY MEMORY" message signal at 1A indicating that programming is complete.

In order to program speed dial numbers only into the unprogrammed set, the subscriber depresses the "NO" key 3 in response to the "PABX DATA ONLY?" prompt message at 1A. In response, a "TEL NUMBERS ONLY?" prompt signal appears at 1A. The subscriber then presses the "YES" key 2, the module transfers the data signals to the set and LCD 1 displays the "COPY MEMORY" prompt message signal at 1A.

In order to program both special feature access codes and speed dial numbers into the unprogrammed set, the subscriber depresses the "NO" soft key 3 in response to both the "PABX DATA ONLY?" and "TEL NUMBERS ONLY?" prompt message signals. LCD 1 then displays a "BOTH PABX/NUMBERS?" prompt message signal at 1A, in response to which subscriber depresses the "YES" soft key 2 which causes the module to transfer the special feature access codes and speed dial number data signals to the set and subsequently display the "COPY MEMORY" prompt message signal at 1A.

The subscriber then disconnects the power cord C from the set S, removes the programming module M and replaces the feature module, and then reconnects the power cord C.

A plurality of unprogrammed sets can be accurately, easily and quickly programmed by following the simple procedure outlined above.

According to the successful prototype, an electrically erasable programmable read only memory (EEPROM) was incorporated in the programming module for storing the data signals. It is well known that the time taken to store data signal in an EEPROM is significantly longer than the time required for reading data therefrom. Consequently, there is an approximately 30 second waiting period required for transferring the data signals from a subscriber set into the module, resulting in generation of the "PLEASE WAIT" prompt message signal discussed above with reference to the steps for programming the module. However, transfer of data signals from the module to a subscriber set is virtually instantaneous, resulting in the "COPY MEMORY" prompt message signal appearing shortly after data signal transference is initiated as discussed above with reference to the steps for programming a subscriber set from the module.

With reference to FIG. 3, a schematic diagram of a preferred embodiment of the programming module M is shown, connected via a connector J to microprocessor circuitry of a TALK TO ® 1000 set, manufactured by Trillium Telephones Systems Inc.

As discussed above, the module is preferably housed within a recess R (FIG. 2) at the rear of the set, in which the connector J is disposed.

The microprocessor circuitry of the set is comprised of a microprocessor 10, such as a Hitachi model 6305 microprocessor, having a data bus 12 and address bus 14 connected thereto. An enable output E, and R/$\overline{\text{W}}$ output are connected to circuitry which generates a data hold signal EFAST for ensuring data signals carried by data bus 12 and applied to I/00-I/07 inputs of CMOS RAM 16 are stored correctly therein.

In particular, the E output of microprocessor 10 is connected to a first input of an AND gate 18, the second input of which is connected to a source of 2 megahertz clock signal, (not shown). The output of AND gate 18 is connected to the clock input of a first flip-flop 20. The R/$\overline{\text{W}}$ output of microprocessor 10 is connected via buffer 22 to a first input of an OR gate 24, the second input being connected to the E output of microprocessor 10. The output of OR gate 24 is connected to reset inputs R of flip-flop 20 and a second flip-flop 26. The $\overline{\text{Q}}$ output of flip-flop 20 is connected to a data input D thereof and to a clock input of flip-flop 26. Set input S of each of flip-flops 20 and 26, and data input D of flip-flop 26 are connected to a source of +5 volts. The Q output of flip-flop 26 is connected to a further AND gate 28 having an output thereof connected via a resistor 30 to a terminal on connector J. Address lines A9 and A10 of bus 14 are connected to A and B inputs of a first decoder 32, and address lines A11 and A12 are connected to the A and B inputs of a further decoder 34. The A13 address line is connected via a buffer 36 to an enable input E of decoder 34, and a Q0 output of decoder 34 is connected to the enable input E of decoder 32.

The Q0 output of decoder 32 is connected to an LCD enable input (not shown) of an LCD driver for enabling LCD 1, and the Q1 output is connected to a watch dog circuit enable input. The LCD and watch dog circuits (not shown) are of well known design and do not form part of the present invention.

The Q2 and Q3 outputs of decoders 32 and 34 are connected to respective terminals of connector J, while the Q1 output of decoder 34 is connected via an inverter 36 to a first input of a further AND gate 38, the second input being connected to the output of AND gate 28, carrying the EFAST control signal.

Decoders 32 and 34 are utilized to decode address signals for selecting RAM, ROM, LCD and watch dog circuitry according to well known memory map principles.

According to the preferred embodiment, RAM 16 is a 2K by 8-bit CMOS RAM which is selected by reading or writing to a predetermined address on address bus 14, causing the Q1 output of decoder 34 to generate a logic low level signal, which in turn causes the output of inverter 36 to generate a logic high level signal. The EFAST signal is gated with the logic high signal from inverter 36 via AND gate 38 such that when both are at logic high levels, RAM 16 is selected. Also, the R/$\overline{\text{W}}$ output of microprocessor 10 is connected to a write enable $\overline{\text{WE}}$ input of RAM 16 to control operation of the RAM 16 in one of either a read or write mode. A power input of RAM 16 is connected to a +5 bolt source and to a battery back-up battery 17, for preserving data storage integrity when the power cord C is disconnected, as discussed above.

The "data hold" time specification of the RAM circuit 16 according to a successful prototype, was 5 nanoseconds for writing data to the RAM circuit. The guaranteed data hold time of microprocessor 10 was 20 nanoseconds from the falling edge of the signal output from the R/$\overline{\text{W}}$ terminal. However, the RAM select signal applied to the C3 input of RAM 16 is derived from gating the EFAST signal with the inverted RAM select signal output from the Q1 terminal of decoder 34, which adds a further 22 nanoseconds of delay. Consequently, the circuitry comprised of flip-flops 10 and 26 was included for lengthening the duration of the chip select signal applied to the C3 input of RAM 16.

The C6 output of microprocessor 10 generates an output enable signal for transmission to an output enable control input $\overline{\text{OE}}$ of an EEPROM 40 of the programming module. The C7 output of microprocessor 10 generates a page control signal for transmission to an A10 address terminal of EEPROM 40.

EEPROM 40, and an EPROM 42 have address inputs A0-A9 and A0-A13 respectively connected to address bus 14 via connector J. Likewise, D0-D7 data terminals of EEPROM 40 and EPROM 42 are connected to the data bus 12 via connector J.

The Q2 and Q3 outputs of decoders 32 and 34 are connected via connector J to first and second inverting inputs of three input OR gates 44 and 46 respectively. The first input of OR gate 44 is connected to a source of +5 volts, and the first inverting input of OR gate 46 is connected to address line 13. The outputs of OR gates 44 and 46 are connected to first inputs of NAND gates 48 and 50 respectively. Second inputs of NAND gates 48 and 50 are connected to the output of resistor 30 carrying the EFAST signal, and third inputs of NAND gates 48 and 50 are connected to the source of +5 volts. The outputs of NAND gates 48 and 50 are connected to chip enable inputs CE of EEPROM 40, and EPROM 42 respectively.

In operation, upon connection of the programming module to the connector J and supply of power to the subscriber set, microprocessor 10 is reset and begins executing a data transfer operating program stored in EPROM 42. EPROM 42 is selected in response to generation of predetermined address signals on address bus 14 causing one of either Q2 or Q3 outputs of decoder 34, or the data signal carried by the address line A13 to go to a logic low level. In response, OR gate 46 generates a logic high level signal for application to NAND gate 50 such that in the event the aforementioned EFAST signal goes to a logic high level signal, the output of NAND gate 50 generates a logic low level signal thereby enabling EPROM 42 via the chip enable CE input thereof.

Data signals stored in EPROM 42 are applied to the D0-D7 inputs of microprocessor 10 via data bus 12 through connector J in a well known manner, in response to predetermined address signal appearing on address bus 14.

In order to select EEPROM 40, predetermined address signals are generated on address bus 14 such that one of the Q2 or Q3 outputs of decoder 32 generates a logic low level signal causing the output of OR gate 44 to generate a logic high level signal for application to an input of NAND gate 48. In response to the aforementioned EFAST data hold signal going to a logic high level, the output of NAND gate 48 goes to a logic low level thereby enabling EEPROM 40.

The output enable $\overline{OE}$ input of EEPROM 40 must be at a logic high level to enable data to be transferred from the subscriber set and stored into EEPROM 40. Conversely, the $\overline{OE}$ input must have a logic low level signal applied thereto for transferring data stored in EEPROM 40 to CMOS RAM 16 of the subscriber set via data bus 12. The C7 output of microprocessor 10 generates a page signal for selecting between two high order pages, or blocks of address storage locations of EEPROM 40 in a well known manner.

Accordingly, data signals corresponding to stored speed call numbers of special feature access codes, may be transferred from CMOS RAM 16 for storage in EEPROM 40, and vice versa, under control of microprocessor 10 executing a data transfer operating program stored in EPROM 42 according to well known techniques.

A person understanding the present invention may conceive of further modifications thereof.

For example, EEPROM 40 can be replaced by a battery backed-up RAM for accomplishing the same function. Alternatively, EEPROM 40 can be replaced by a programmed ROM storing data signals corresponding to proprietary PBX or centrex special feature access codes. In the latter case, the programming module M may not be programmed from an already programmed subscriber set, but is merely used to program a plurality of unprogrammed sets according to the preprogrammed proprietary access codes.

All such modifications and embodiments are considered to be within the sphere and scope of the present invention as defined in the claims appended hereto.

We claim:

1. For use with a programmable subscriber set having the capability to store a plurality of predetermined data signals designating a corresponding plurality of telephone special features; a subscriber set programming module, comprised of memory means for storing said predetermined data signals and means for loading said data signals into said subscriber set, whereby said subscriber set becomes programmed in accordance with said stored data signals, wherein said memory means is a ROM for storing data signals corresponding to proprietary special feature access codes.

2. A programming module as defined in claim 1, further including means for receiving and storing said data signals from said programmed subscriber set into said memory means, whereby said module becomes programmed with said received data signals.

3. A programming module as defined in claim 1, wherein said data signals are comprised of digital representations of speed call numbers.

4. A programming module as defined in claim 1, wherein said data signals are comprised of digital representations of special feature access codes.

5. A programming module as defined in claim 1, further comprised of an erasable programmable memory means for storing and loading said data signals.

6. A programming module as defined in claim 1, further comprised of an EEPROM for storing and loading said data signals.

7. A programming module as defined in claim 2, further comprised of read only memory means for storing command signals and means for transmitting said command signals to said subscriber set for controlling said receiving, storing and loading of the data signals.

8. A programming module as defined in claim 7, wherein transmission of predetermined ones of said command signals results in generation of prompt message signals at said subscriber set, for aiding a local subscriber in programming said module and said subscriber set.

9. A method of programming a programmable subscriber set for initiating execution of a plurality of telephone special features in accordance with predetermined data signals stored therein; comprising the steps of:

(a) connecting a programming module including memory means for storing said data signals, to said programmable subscriber set, (b) transferring said data signals stored in said module to said programmable subscriber set, (c) disconnecting said module from said subscriber set, whereby said programmable subscriber set becomes programmed in accordance with said stored data signals, (d) disconnecting a feature module connected to said set prior to connecting said programming module thereto, and (e) reconnecting said feature module subsequent to disconnecting said programming module therefrom.

10. A method as defined in claim 9, further including the steps of disconnecting power applied to said subscriber set prior to connecting and disconnecting said module, and reconnecting power to said set thereafter.

11. A method as defined in claim 10, wherein one or more of said steps are performed in response to predetermined prompt message signals being generated by said set for aiding a local subscriber in programming said programmable subscriber set.

12. A method of programming a programmable subscriber set for initiating execution of a plurality of telephone special features in accordance with predetermined data signals stored in a programmed subscriber set; comprising the steps of:

(a) connecting a programming module including memory means for storing said data signals, to said programmed subscriber set, (b) transferring said stored data signals from said programmed set to said module for storage in said memory means, (c) disconnecting said module from said programmed set, (d) connecting said module to said programmable subscriber set, (e) transferring said stored signals from said module for storage in said programmable set, (f) disconnecting said module from said programmable set, whereby said programmable set becomes programmed in accordance with said data signals stored in said programmed set, (g) disconnecting respective feature modules connected to said programmed and programmable sets prior to connecting said programming module thereto, and (h) reconnecting said feature modules subsequent to disconnecting said programming module from said sets.

13. A method as defined in claim 12, further including the steps of disconnecting power applied to said programmed and programmable subscriber sets prior to connecting and disconnecting said module, and reconnecting power to said sets thereafter.

14. A method as defined in claim 13, wherein one or more of said steps are performed in response to predetermined prompt message signals being generated by said sets for aiding a local subscriber in programming said module from said programmed set and programming said programmable subscriber set from said module.

15. A subscriber set programming module for use with a plurality of programmable subscriber sets each including microprocessor circuitry for initiating execution of a plurality of telephone special features in accordance with predetermined data signals stored therein, comprised of:
 (a) programmable memory means for receiving and storing said predetermined data signals from a programmed one of said sets, and transmitting said data signals for storage in one or a plurality of unprogrammed ones of said sets,
 (b) read only memory means for storing data transfer operating program signals and transmitting said program signals to microprocessor circuitry of said sets, for controlling said receiving, storing and transmitting of said data signals,
 (c) logic circuitry for connection to said microprocessor circuitry of said sets, for enabling respective ones of said programmable and read only memory means, and
 (d) wherein said data signals are digital representation of special feature access codes.

16. A subscriber set programming module as defined in claim 15, wherein said data signals are comprised of digital representations of speed call numbers.

17. A subscriber set programming module as defined in claim 15, wherein said programmable memory means is comprised of an EEPROM.

18. A subscriber set programming module as defined in claim 16, wherein said read only memory means is comprised of one of either an EPROM or ROM.

19. A subscriber set programming module as defined in claim 16, wherein said logic circuitry is comprised of a plurality of NAND and OR gates for receiving predetermined control signals from said microprocessor circuitry and generating enable signals in response thereto, for enabling predetermined ones of said programmable and read only memory means.

20. A subscriber set programming module as defined in claim 16, wherein said program signals include signals for causing generation of prompt message signals by said microprocessor circuitry.

* * * * *